United States Patent [19]

Yoneya

[11] 4,065,835

[45] Jan. 3, 1978

[54] NET JOINTING STRUCTURE

[75] Inventor: Kiyoo Yoneya, Kurobe, Japan

[73] Assignee: Yoshida Kogyo Kabushiki Kaisha, Japan

[21] Appl. No.: 739,439

[22] Filed: Nov. 8, 1976

[30] Foreign Application Priority Data

Nov. 13, 1975 Japan ............................ 50-154411[U]

[51] Int. Cl.² ............................................. A44B 19/34
[52] U.S. Cl. .......................... 24/205.16 R; 24/205 R; 66/195
[58] Field of Search ................... 66/195; 24/205.16 R, 24/205 R

[56] References Cited

U.S. PATENT DOCUMENTS

| | | | |
|---|---|---|---|
| 2,652,705 | 9/1953 | Weinberg | 24/205.16 R |
| 2,996,905 | 8/1961 | Scheibe | 66/192 |

Primary Examiner—Bernard A. Gelak
Attorney, Agent, or Firm—Bucknam and Archer

[57] ABSTRACT

A net jointing structure for jointing opposite net ends together comprises a pair of adapter nets each including a net region and a tape-carrying region extending outwardly from the net region. A slide fastener is provided between the adapter nets for coupling and uncoupling the adapter nets. A pair of connecting cords are disposed in engagement with the outer edges of the respective net regions for connecting the adapter ends to the opposite net ends. Each of the adapter nets is formed of a warp-knitted structure which is arranged symmetrically with respect to its central axis along which the warp-knitted structure is folded upon itself in exactly overlapped relationship. Each of the connecting cords is interposed between the folded warp-knitted structure and extends along the outer folded edge thereof. The connecting cord is adapted to be pulled out of the folded outer edge through the meshes thereof at spaced points along the length thereof to provide a plurality of connecting turns connectable to the net end via suitable fastening means such as threads without regard to the pitch of the meshes in the net end.

3 Claims, 7 Drawing Figures

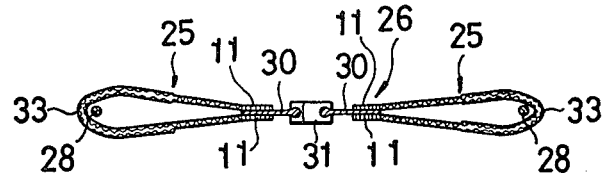
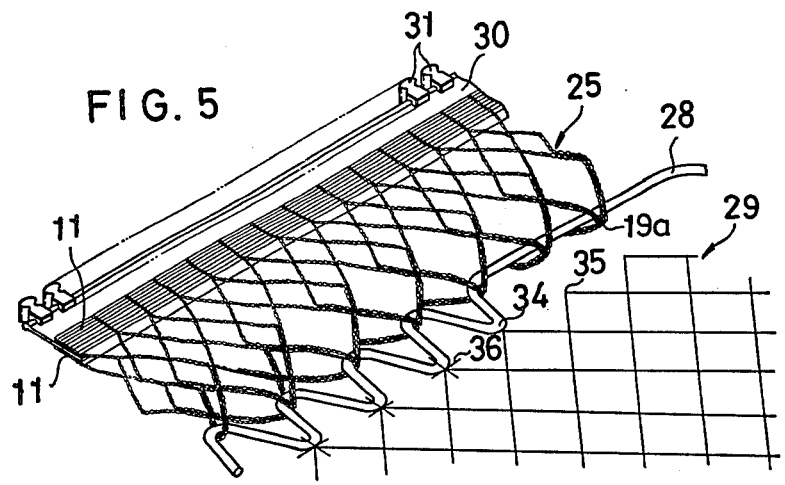
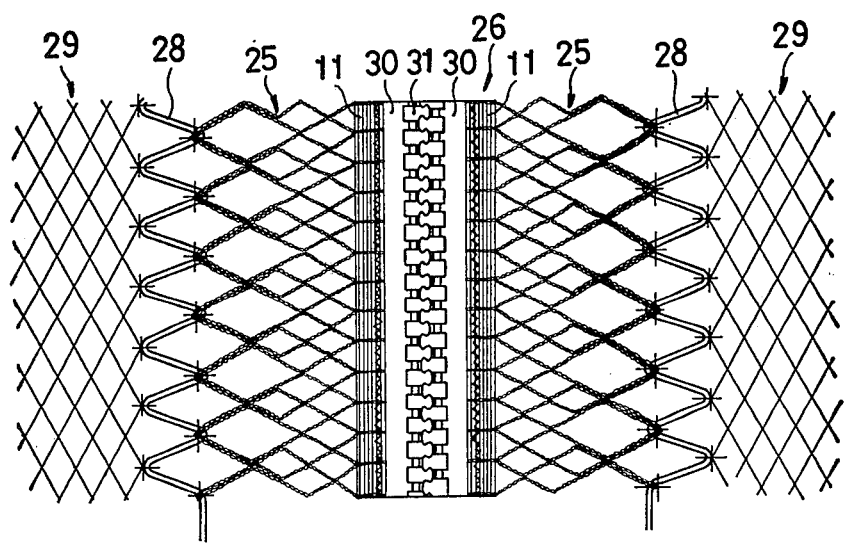

NET JOINTING STRUCTURE

BACKGROUND OF THE INVENTION

1. Field of the Invention

This invention relates generally to a net jointing structure for separably jointing opposite net ends together, and more particularly to a net jointing structure provided with a slide fastener.

2. Prior Art

The prior art net jointing structures under consideration have a pair of elongated adapter nets carrying on and along their confronting longitudinal edges a pair of stringers of a slide fastener for separably coupling the adapter nets. The coventional practice of installing these known net jointing structures between adjacent nets such as fishing nets is simply to tie the other longitudinal edges of the adapter nets and opposite net ends together, respectively, by threads or similar fastening means. This procedure has been found not wholly satisfactory, however, in that the adapter nets can not be easily and rapidly attached to the net ends. Another problem is that the adapter nets can not always be attached to the net ends with sufficient stability to prevent the adapter nets from becoming deformed or wavy along the length thereof. This difficulty arises out of the fact that the pitch of the meshes in the outer edge portion of the adapter net in the longitudinal direction thereof are not always equal to the pitch of the meshes in the net end.

SUMMARY OF THE INVENTION

It is therefore an object of this invention to provide a net jointing structure which is capable of connection between the opposite ends of adjacent nets with utmost ease and stability without regard to the pitch of the meshes in the nets.

According to the invention, there is provided a net jointing structure for opposite net ends together comprising a pair of adapter nets each including a net region and a tape-carrying region extending outwardly from the net region. A slide fastener is provided for coupling and uncoupling the adapter nets. The slide fastener includes a pair of stringer tapes carrying on and along their confronting inner edges a pair of series of interengageable fastener elements. The stringer tapes are secured to the tape-carrying regions, respectively, and are taken into and out of mutual engagement by a slider movable along the fastener elements. A pair of connecting cords are provided for connecting the adapter nets to the opposite net ends, each of the connecting cords being disposed in engagement with the outer edge of the net region. Each of the adapter nets is formed of a warp-knitted structure having a pair of opposite web portions and a net portion lying between the web portions. The warp-knitted structure is arranged symmetrically with respect to its central axis along which the warp-knitted structure is folded upon itself in exactly overlapped relationship to provide the adapter net so that the registered web portions and the folded net portion constitute the tape-carrying region and the net region, respectively. Each of the connecting cords is interposed between the folded net portion and extends along the outer edge of the folded net portion. The connecting cord is adapted to be pulled out of the folded edge through the meshes thereof at spaced points along the length thereof to provide a plurality of connecting turns connectable to the net end.

Many other advantages and features of the present invention will become manifest to those versed in the art upon making reference to the detailed description and the accompanying sheets of drawings in which preferred structural embodiments incorporating the principles of the present invention are shown by way of example.

BRIEF DESCRIPTION OF THE DRAWINGS

FIG. 3 is a view similar to FIG. 2 but showing the net jointing structure attached between the opposite ends of the fishing nets via the connecting cords;

FIG. 4 is a cross-sectional view taken along the line IV—IV of FIG. 2;

FIG. 5 is a perspective view of the adapter net, showing the manner in which the same is attached to the net end via the connecting cord;

DESCRIPTION OF THE PREFERRED EMBODIMENTS

Figure 1:
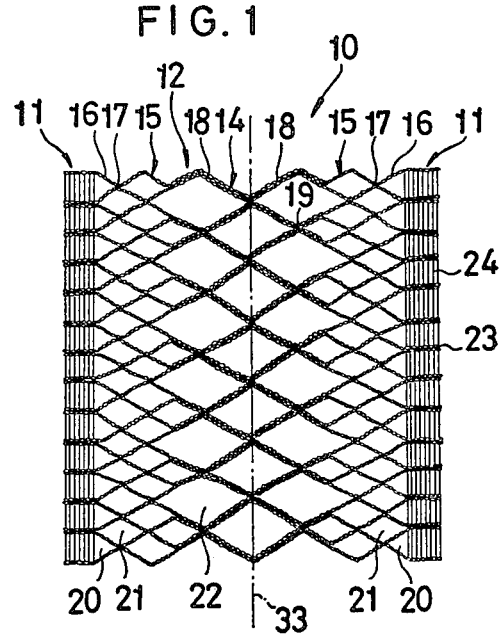
FIG. 1 is a front elevational view of a warp-knitted structure from which an adapter net is formed.

FIG. 1 shows a warp-knitted structure 10 having a pair of opposite web portions 11, 11 and a net portion 12 lying between the web portions. The warp-knitted structure 10 is arranged symmetrically with respect to a central axis 13. The net portion 12 has a central net section 14 and a pair of opposite net sections 15, 15 of identical make, the central net section 14 being larger in mesh size than the net sections 15, 15. Each of the net sections 15, 15 is formed of a plurality of warp chains 16 each connected to its adjacent one at spaced points 17 in a direction transverse to the central axis 13 to provide a meshwork. Similarly, the central net section 14 is formed of a plurality of paired warp chains 18 each connected to its adjacent one at connecting points 19. The only meshes 20 which lie immediately adjacent to the web portions 11, 11 are in the form of an equilateral triangle while all the other meshes 21, 22 are in the form of a rhombus, the connecting points or knots 17, 19 representing the vertices of the rhombus-shaped meshes 21, 22, respectively. Each of the web portions 11, 11 comprises a plurality of paired warp chains 23 extending from those 16 constituting the equilateral-triangular meshes 20 adjacent to the web portion 11, and laid-in threads 24 connecting the paired warp chains 23 transversely together, the paired warp chains 23 extending in a direction transverse to the central axis 13. The net portion 12 may have a plurality of net sections of more than three different mesh sizes which are reduced progressively in mesh size from the central one toward the opposite ones lying adjacent to the web portions 11, 11. The warp-knitted structure 10 is folded upon itself along the central axis 13 in exactly overlapped relationship to provide an adapter net 25.

Figure 2:
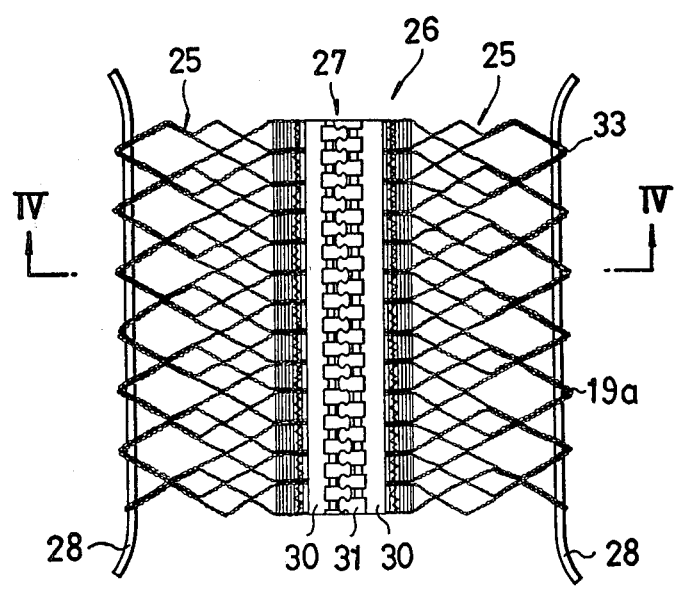
FIG. 2 is a front elevational view of a net jointing structure according to this invention haivng a pair of adapter nets and a pair of connecting cords.

A net jointing structure 26 according to the invention, best shown in FIGS. 2 and 3, comprises a pair of adapter nets 25, 25, a slide fastener 27 for jointing the pair of adapter nets 25, 25 together, and a pair of flexible cords 28, 28 for attaching the adapter nets 25, 25 to opposed ends of adjacent fishing nets 29, 29. The slide fastener 27 comprises a pair of stringer tapes 30, 30 carrying on and along their opposed inner longitudinal edges a series of uniformly spaced, interengageable fastener elements 31, the stringer tapes being capable of mutual engagement (FIGS. 2 and 3) by a slider (not shown) movable along the fastener elements 31 to close the slide fastener 27. Each of the stringer tapes 30, 30 is sandwiched between the sewn to the registered web portions 11, 11.

For attachment of each of the connecting cords 28, 28 to the adapter net 25, the connecting cord 28 is placed on the warp-knitted structure 10 (FIG. 1) along the central axis 13, and then the warp-knitted structure 10 is folded upon itself along the central axis 13 as previously mentioned so that the connecting cord 28 is disposed along the folded edge 33 of the adapter net 25. In this condition, the connecting cord 28 is disposed in contact with the adapter net 25 at the outermost knots 19a to prevent the connecting cord 28 from moving laterally outwardly out of engagement with the adapter net 25.

For attaching the net jointing structure 26 to the opposed ends of the fishing nets 29, 29, each of the connecting cords 28, 28 is first pulled out laterally at a point intermediate each adjacent outermost knots 19a to provide a connecting turn 34 as best shown in FIG. 5. Then, the connecting turn 34 and a corresponding endmost knot 35 of the fishing net 29 are united together by any suitable means such as a thread 36. The connecting cord 28 is also secured to the adapter net 25 by threads 37 at the knots 19a (FIG. 3).

In this manner, each of the adapter nets 25, 25 is connected to the corresponding end of the fishing net 29, along the entire length thereof by the connecting cord 28 so that the connecting cord 28 finally extends in meandering path as best shown in FIG. 3. In this embodiment, the pitch of the meshes 22 in the central net section 14 in the longitudinal direction of the adapter net 25 is substantially equal to the pitch of the meshes in the fishing net 29.

Figure 6:
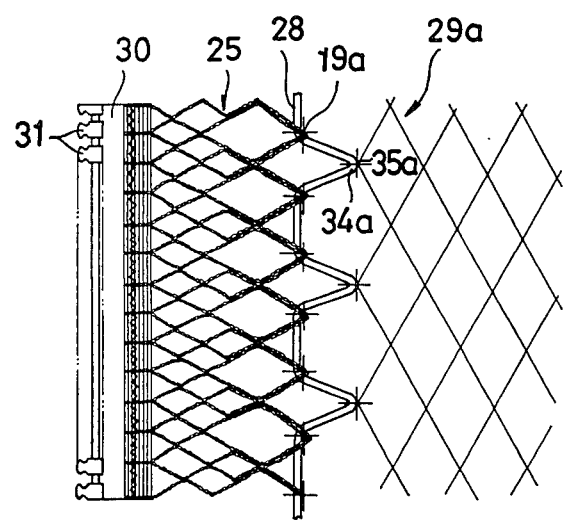
FIG. 6 is a front elevational view of the adapter net shown attached to a net end of larger mesh size.

FIG. 6 shows another embodiment of the invention in which there is employed a fishing net 29a whose meshes have a pitch substantially twice as long as that of the meshes 22 in the central net section 14 in the longitudinal direction of the net adapter 25. Each of the connecting cords 28, 28 is pulled out laterally at a point intermediate every other outermost adjacent knots 19a to provide a connecting turn 34a. Then, the connecting turn 34a and a corresponding endmost knot 35a of the fishing net 29a are tied together as described in the preceding embodiment in FIGS. 3 and 5.

Figure 7:
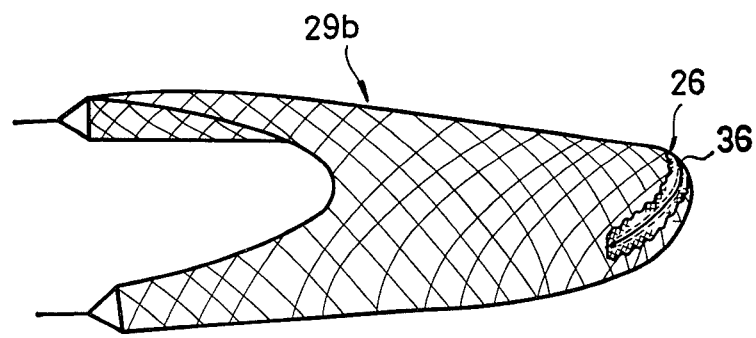
FIG. 7 is a perspective view of a trawl net, showing the net jointing structure attached to the mouth of the trawl net.

The net jointing structure 26 according to the invention may be attached to the mouth 36 of a fishing net 29b such as a trawl net 38 (FIG. 7), seine or drift net through which mouth the caught fish is taken out of the net simply by manipulating the slider in the fastener opening direction to open the mouth 36.

When the net jointing structure 26 according to this invention has been specifically described herein, the invention itself is not to be restricted by the exact showing of the drawings or the description thereof. For example, the warp-knitted structure 10 may consist of a net portion having a plurality of sections reduced progressively in mesh size from the central one toward the ones lying adjacent to the opposite ends thereof, the opposite net sections being sufficiently small in mesh size to support the stringer tape therebetween to obviate the need for the web portions 11,11. The adapter net may be of uniform mesh size throughout the entire width.

The provision of the connecting cord 28 ensures that the adapter net 25 can positively be attached to the net end even when the fishing net has a relatively large mesh size as shown in FIG. 6. Without the connecting cord, the adapter net has to be attached to the net end by tying every other knot 19a and every knot 34a together as was the case with the prior art net jointing structures. This would not only result in reduced strength of connection between the adapter net and net end, but also permit the adapter net to become deformed or wavy in the longitudinal direction thereof because the untied knots 19a cannot be kept taut sufficiently in the lateral direction.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A net jointing structure for jointing opposite net ends together comprising:
    a. a pair of adapter nets each including a net region and a tape-carrying region extending outwardly from said net region;
    b. a slide fastener for coupling and uncoupling said adapter nets, said slide fastener including a pair of stringer tapes carrying on and along their confronting inner edges a pair of series of interengageable fastener elements, said stringer tapes being secured to said tape-carrying regions, respectively, and said stringer tapes being taken into and out of mutual engagement by a slider movable along said fastener elements; and
    c. a pair of connecting cords for connecting said adapter nets to the opposite net ends, each of said connecting cords being disposed in engagement with the outer edge of said net region;
    d. each of said adapter nets being formed of a warp-knitted structure having a pair of opposite web portions and a net portion lying between said web portions, said warp-knitted structure being arranged symmetrically with respect to its central axis along which said warp-knitted structure is folded upon itself in exactly overlapped relationship to provide said adapter net so that the registered web portions and the folded net portion constitute said tape-carrying region and said net region, respectively, each of said connecting cords being interposed between said folded net portion and extending along the outer edge of said folded net portion, and said connecting cord being adapted to be pulled out of said folded edge through the meshes thereof at spaced points along the length thereof to provide a plurality of connecting turns connectable to the net end.

2. A net jointing structure according to claim 1, in which each of said stringer tapes is sandwiched between and secured to said web portions.

3. A net jointing structure according to claim 1 in which said net portion includes a plurality of sections being progressively reduced in mesh size from the central one toward the opposite ones lying adjacent to said web portions.

* * * * *